United States Patent
Nandyalam et al.

(10) Patent No.: US 9,521,052 B1
(45) Date of Patent: Dec. 13, 2016

(54) METHODS, SYSTEMS, AND COMPUTER READABLE MEDIUMS FOR UTILIZING APPLICATION PROGRAMMING INTERFACES FOR ACCESSING KEY PERFORMANCE INDICATOR INFORMATION

(71) Applicant: VCE Company, LLC, Richardson, TX (US)

(72) Inventors: Rajesh Nandyalam, Whitinsville, MA (US); Bayi Peng, Plano, TX (US); Xiaohong Fu, Plano, TX (US)

(73) Assignee: VCE Company, LLC, Richardson, TX (US)

( * ) Notice: Subject to any disclaimer, the term of this patent is extended or adjusted under 35 U.S.C. 154(b) by 299 days.

(21) Appl. No.: 14/137,398

(22) Filed: Dec. 20, 2013

(51) Int. Cl.
*H04L 12/26* (2006.01)
*G06F 11/30* (2006.01)

(52) U.S. Cl.
CPC ........... *H04L 43/08* (2013.01); *G06F 11/3003* (2013.01)

(58) Field of Classification Search
CPC ....... H04L 43/00–43/18; G06F 11/30–11/3096
See application file for complete search history.

(56) References Cited

U.S. PATENT DOCUMENTS

| | | | | |
|---|---|---|---|---|
| 8,593,982 | B1* | 11/2013 | Wurtenberger | H04L 1/20 370/252 |
| 2005/0114505 | A1* | 5/2005 | DeStefano | G06F 17/2705 709/224 |
| 2006/0007870 | A1* | 1/2006 | Roskowski | H04L 43/00 370/252 |
| 2007/0118524 | A1* | 5/2007 | Farmer | G06F 17/30595 |
| 2008/0021994 | A1* | 1/2008 | Grelewicz | G06F 11/3428 709/224 |
| 2009/0164173 | A1* | 6/2009 | Gupta | H04L 41/5009 702/186 |
| 2010/0094812 | A1* | 4/2010 | Konik | G06F 17/3051 707/690 |
| 2014/0047342 | A1* | 2/2014 | Breternitz | G06F 9/5061 715/735 |
| 2014/0051416 | A1* | 2/2014 | Loborg | H04W 24/10 455/418 |
| 2015/0046512 | A1* | 2/2015 | Ashby | H04Q 9/00 709/203 |
| 2015/0222488 | A1* | 8/2015 | Schmetz | H04W 24/02 370/241.1 |

* cited by examiner

*Primary Examiner* — Nicholas Taylor
*Assistant Examiner* — Clayton R Williams
(74) *Attorney, Agent, or Firm* — Jenkins, Wilson, Taylor & Hunt, P.A.

(57) ABSTRACT

Methods, systems, and computer readable mediums for implementing an attribute into a network system are disclosed. According to one method, the method includes collecting raw data from a network node and defining a performance indicator definition associated with the collected raw data. The method can also include integrating the performance indicator definition into an attribute monitoring entity, and injecting the entity into a repository during system runtime.

20 Claims, 4 Drawing Sheets

FIG. 1

```
        202                                                    200
   203    ⟍   <KpiDefinition>                               ⟋
204 ⟍         ─────<id>2</id>
      ⟍       <name>remainingRawCapacity</name>
         208  <alias>freeRaw</alias>
           ⟍  <formula>remainingRawCapacity/1073741824.0</formula>
         209  <componentTagName>StorageArray</componentTagName>
         211  <numericType>LONG</numericType>
         212  <measureType>COUNT</measureType>
         213  <category>ENTRY_PRIMITIVE</category>
         214  <aggregationType>SUM</aggregationType>
         215  <rollupType>AVG</rollupType>
         210  <unit>GB</unit>
         217  <description></description>
         206  <label>Free Raw</label>
        </KpiDefinition>
                                              FIG. 2A
```

```
                                                               220
   222  <KpiDefinition>                                     ⟋
      ⟍      ─────<id>106</id>
         225  <name>remainingRawSpacePct</name>
         224  <alias>freeRawPct</alias>
         226  <formula>100*freeRaw/totalRaw</formula>
         227  <componentTagName>StorageArray</componentTagName>
         229  <numericType>FLOAT</numericType>
         228  <measureType>PERCENTAGE</measureType>
         231  <category>ENTRY_DERIVED</category>
         234  <aggregationType>AVG</aggregationType>
         235  <rollupType>AVG</rollupType>
         233  <unit>%</unit>
         223  <description></description>
         230  <label>Free Raw (%)</label>
        </KpiDefinition>
                                              FIG. 2B
```

| 302 | 304 | 316 | 310 | 308 | 318 | 312 | 306 | 314 |
|---|---|---|---|---|---|---|---|---|
| kpiid | host | dbid | calstatus | geo | moname | serialnum | value | cisinfo |
| X | xxx.xxx.xx.xxx.com | XX | critical | San Joe, CA | CLARiiON+APMxxxx xxxxxxxxx | CB200-xxx-xxx-xxx | 4XXXX | cis xxxxx |

```
kpiid | host         dbid calstatus | geo       | moname         | serialnum       | value | cisinfo
------+------------------+----+------+-----------+----------------+-----------------+-------+---------
   1| auto206.vtg.abx.com | 18 | critical | marlborough, MA | CLARiiON+APM00130529406 | CB200-975-318-642    |  4813 | CIS 200EX
   1| auto207.vtg.abx.com | 18 | critical | San Jose, CA    | CLARiiON+APM00124837909 | V3FX1-CB300-975-318-642 | 19000 | CIS 300EX
   1| fm125.vtg.abx.com   | 18 | critical | San Jose, CA    | CLARiiON+APM00130236923 | V3FX1-CB300-975-318-642 | 1.0361e+05 | CIS 300EX
   1| fm126.vtg.abx.com   | 18 | critical | Marlborough, MA | CLARiiON+APM00130529406 | CB200-111-222-333    |  4813 | CIS 200EX
   1| fm52.vtg.abx.com    | 18 | critical | San Jose, CA    | CLARiiON+APM00124837909 | V3FX1-CB300-975-318-642 | 19000 | CIS 300EX
   2| auto206.vtg.abx.com | 18 | critical | Marlborough, MA | CLARiiON+APM00130529406 | CB200-975-318-642    |  5565 | CIS 200EX
   2| auto207.vtg.abx.com | 18 | critical | San Jose, CA    | CLARiiON+APM00124837909 | V3FX1-CB300-975-318-642 | 2330.7 | CIS 200EX
   2| fm125.vtg.abx.com   | 18 | critical | San Jose, CA    | CLARiiON+APM00130236923 | V3FX1-CB300-975-318-642 | 28335 | CIS 300EX
   2| fm126.vtg.abx.com   | 18 | critical | Marlborough, MA | CLARiiON+APM00130529406 | CB200-975-318-642    |  5565 | CIS 200EX
   2| fm52.vtg.abx.com    | 18 | critical | San Jose, CA    | CLARiiON+APM00124837909 | V3FX1-CB300-975-318-642 | 2330.7 | CIS 300EX
 106| auto206.vtg.abx.com | 18 | critical | Marlborough, MA | CLARiiON+APM00130529406 | CB200-975-318-642    | 11.561 | CIS 200EX
 106| auto207.vtg.abx.com | 18 | critical | San Jose, CA    | CLARiiON+APM00124837909 | V3FX1-CB300-975-318-642 | 12.266 | CIS 200EX
 106| fm125.vtg.abx.com   | 18 | critical | San Jose, CA    | CLARiiON+APM00130236923 | VSJ3FX1-CB300-975-318-642 | 27.347 | CIS 300EX
 106| fm126.vtg.abx.com   | 18 | critical | Marlborough, MA | CLARiiON+APM00130529406 | CB200-975-318-642    | 11.561 | CIS 200EX
 106| fm52.vtg.abx.com    | 18 | critical | San Jose, CA    | CLARiiON+APM00124837909 | V3FX1-CB300-975-318-642 | 12.266 | CIS 300EX
```

METHODS, SYSTEMS, AND COMPUTER READABLE MEDIUMS FOR UTILIZING APPLICATION PROGRAMMING INTERFACES FOR ACCESSING KEY PERFORMANCE INDICATOR INFORMATION

TECHNICAL FIELD

The subject matter described herein relates to monitoring network system performance. More specifically, the subject matter relates to methods, systems, and computer readable mediums for accessing key performance indicator information via application programming interfaces (API).

BACKGROUND cloud networks and other industries (e.g., telecommunication, finance, sales, marketing services, etc.) for monitoring system performance. KPIs can be scattered at different granularities, hierarchies, and categories of managed system objects. Collecting and managing KPI data can be difficult because a network system can be large in size with numerous tiers and sections, making data collection a challenging task. Furthermore, preserving and presenting the data to consumers is an equally daunting task. In addition, introducing new KPI definitions or updating the current KPIs within the network system requires shutting down the system, causing service delays and high maintenance costs. As such, complex and big cloud networks are difficult and expensive to monitor and maintain due to the difficulty in managing the KPIs.

SUMMARY

In accordance with this disclosure, methods, systems, and computer readable mediums for implementing an attribute monitoring entity into a network system are disclosed. According to one embodiment, the subject matter described herein can comprise a method for implementing an attribute monitoring entity into a network system. The method can include collecting raw data from a network node, defining a performance indicator definition associated with the collected raw data, integrating the performance indicator definition into an attribute monitoring entity, and injecting the entity into a repository during system runtime.

BRIEF DESCRIPTION OF THE DRAWINGS

The subject matter described herein will now be explained with reference to the accompanying drawings of which:

FIG. 3 illustrates an example of KPI data being stored in a database system in accordance with embodiments of the subject matter disclosed herein;

DETAILED DESCRIPTION

The subject matter described herein discloses methods, systems, and computer readable mediums for accessing key performance indicator information. Although the subject matter can be used to implement metadata and KPIs as described for the examples herein, other software entities associated with a computer network may also be implemented without departing from the scope of the disclosed subject matter. As used herein, a KPI may be a software entity utilized by a network system (e.g. system with both hardware and software components) for collecting and monitoring raw data (e.g., system performance data).

In some embodiments, raw data can be collected from network nodes associated with a database system. As used herein, the term "node" refers to a physical computing platform including one or more processors and memory. The collected systems data can be processed by a data management module configured to generate an attribute monitoring entity (AME) for the database. For example, the generated attribute monitoring entity can comprise performance indicators configured to monitor specific performance aspects of the database. The attribute monitoring entity can be injected into the data during run time, thus allowing dynamic modeling and updating of the performance indicators. As used herein, "injecting" refers to adding, incorporating into, inserting, or modifying to include an entity into a repository.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
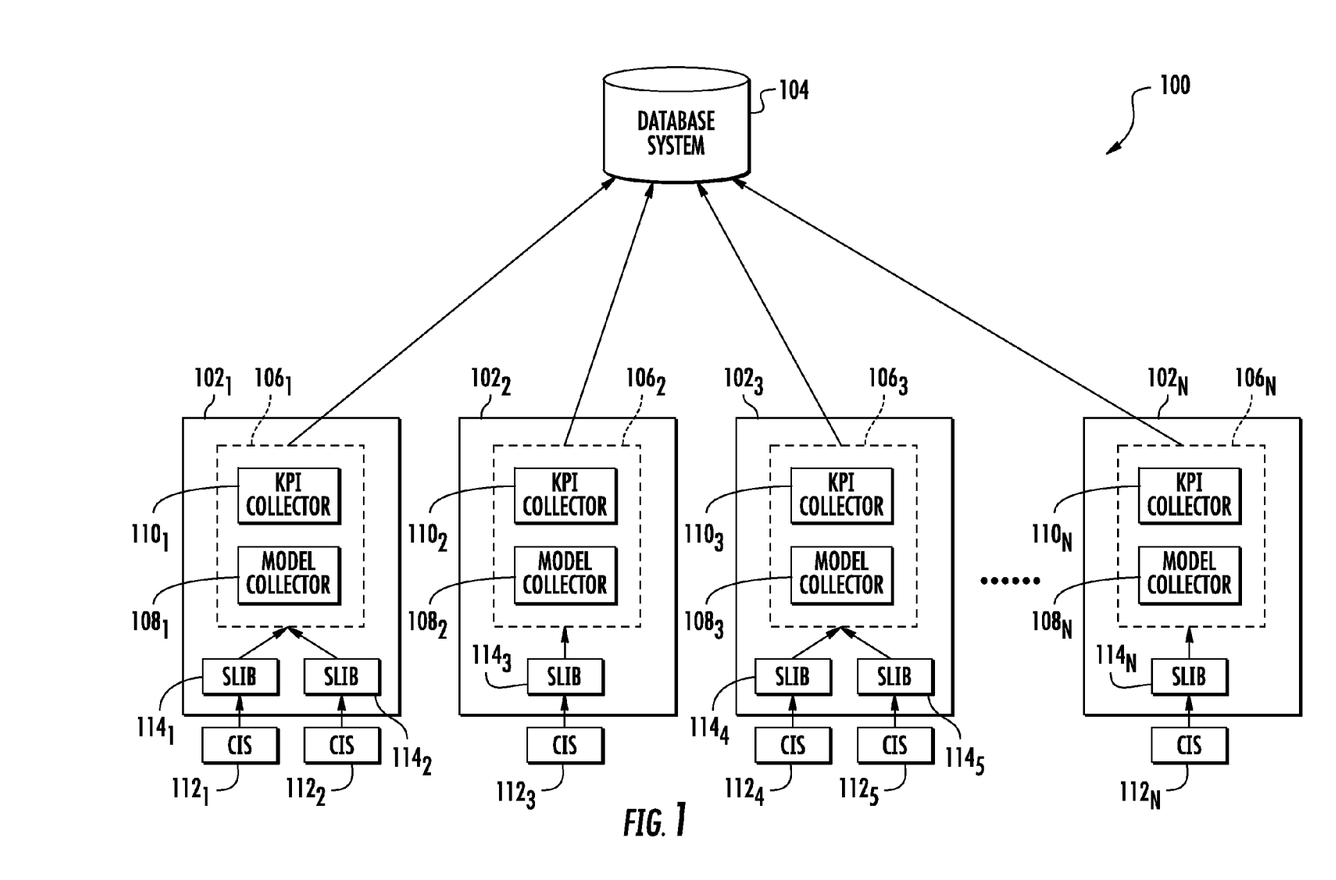
FIG. 1 illustrates a network system comprising a plurality of hardware based units providing key performance indicators to a database system in accordance with embodiments of the subject matter disclosed herein.

FIG. 1 illustrates a network system, generally designated 100, of a plurality of hardware based units (e.g., a server with a processor and memory) $102_{1-N}$ providing key performance indicators (KPIs) to a database system 104, in accordance with embodiments of the subject matter disclosed herein. In some embodiments, a hardware based unit $102_1$ can be communicatively connected to one or more CISs (e.g., CISs $112_{1,2}$) and includes network modules configured to collect and process raw data (e.g., system performance data or system attribute data). In some embodiments, database system 104 can include a repository, a database, or a database management system. In some embodiments, the repository or database can include a single database, an open source repository or database, a distributed repository or database, an open source distributed repository or database, and the like.

In some embodiments, hardware based units $102_{1-N}$ can be communicatively connected to database system 104 and configured to provide raw data, such as system performance data, to database system 104. For example, hardware based units $102_{1-N}$ can be configured to collect and process raw data from network nodes (CISs) and provide processed raw data to database system 104. As illustrated in FIG. 1, hardware based units $102_{1-N}$ can comprise a data management modules $106_{1-N}$ configured to collect and process the raw data. For example, data management modules $106_{1-N}$ can be Central Vblock™ Systems Management (CVM) modules, which can comprise model collector modules $108_{1-N}$ configured to collect raw data from a data stream or a network node. It should be noted that other data sources can also be conveniently utilized to provide raw data to data management module $106_{1-N}$, as the example used here is provided to explain an example of the subject matter and is not intended as a limitation.

In some embodiments, data management module $106_1$ can comprise a key performance indicator (KPI) collector $110_1$ (e.g., a KPI collection module) configured to process the raw data. KPI collector $110_1$ can be configured to receive raw data from model collectors $108_1$ and process the received raw data as needed. For example, model collector $108_1$ can provide to KPI collector $110_1$ raw data about the amount of storage space available on a converged infrastructure system (CIS) $112_1$, such as a Vblock™ Systems manufactured by VCE Company LLC of Richardson, Tex. Upon receiving such information, KPI collector $110_1$ can calculate a key performance indicator related to the remaining raw capacity on the CIS $112_1$ by applying a mathematical formula to the received raw data. In another example, a KPI related to a remaining raw space percentage of the CIS $112_1$ can be defined by dividing the received raw data by the total raw storage space available on CIS $112_1$, and then multiply the resulting ratio by one hundred. Whereas used herein, the term "remaining raw capacity" can refer to the amount of storage space available on CIS $112_1$. In other embodiments, KPI collector $110_1$ can be configured to calculate the total bandwidth used over a specified period of time, or the average count of unavailable nodes. Once processed, data can be inserted into a repository or database associated with database system 104 and will be available for remote access.

In some embodiments, KPI collector $110_1$ can collect raw data from one or more CISs (e.g., CISs $112_{1,2}$) and/or other data feeds. A KPI aggregation engine (not shown) can be associated with data management module $106_1$ and configured to aggregate KPI values collected from the various data feeds. The aggregation of KPI values can be performed based on predefined metrics and/or aggregation functions, such as calculating the average, maximum, minimum, sum, number of occurrences, or standard deviation of the collected KPI values. For example, for an order-handling process in which order approval could be manual or automatic, a user can define an instance-level metric named "ManualOrderApprovalTime". This metric can be configured to calculate the time for each manual order approval by subtracting the time stamp of the event indicating that manual approval was required from the time stamp of the order approval (or rejection). The user can then define a KPI that calculates the average value of these metrics, using a target of 48 hours and, optionally, ranges for unacceptable, acceptable, and excellent manual order approval times. In other embodiments, data management module $106_1$ can also include a KPI rollup engine (not shown) configured to roll up KPI data to different time granularities. For example, KPI data collected on hourly basis can be aggregated and rolled as daily KPI data by the KPI rollup engine. Similarly, KPI rollup engine can also be configured to rollup daily KPI data into weekly data and roll up weekly data into monthly data, and so forth. In addition, hardware based unit $102_1$ can also include one or more system libraries (SLIBs) (e.g., SLIBs $114_{1,2}$) configured to provide operation procedures to the database hardware.

In some embodiments, raw data from previously unknown data sources can be collected upon a user's request. For example, a new metric "available capacity" previously undefined to a network system (e.g., no model or driver available within the system for the new metric) can be integrated into a key performance indicator upon a user's request. The new metric and the KPI can be inserted into the network system as part of a metadata entity. In such a scenario, the network system can be configured to collect data from data sources previously unknown to the system but requested by the user, such as a storage array that is not a part of the system, and process the collected data as instructed by the metadata. As such, via the insertion of metadata entity, the network system is configured to not only collecting raw data for metrics that are known to the system, but also capable of mining new data from previously unknown data sources.

Figure 2A:
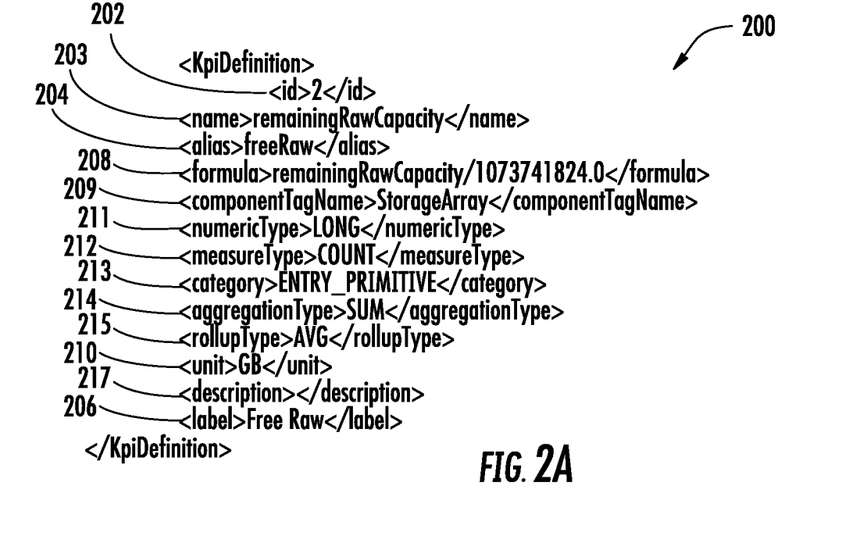
FIGS. 2A and 2B illustrate exemplary examples of KPI definitions embedded in an application programming interface (API) as defined by metadata, in accordance with embodiments of the subject matter disclosed herein.
Figure 2B:
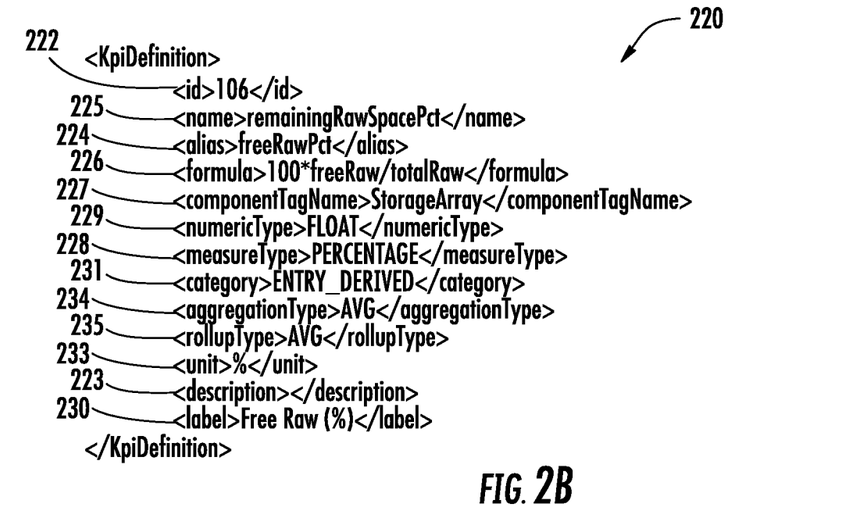

In some embodiments, a key performance indicator can be defined within a metadata entity. As used herein, a metadata entity can be a software entity containing at least one KPI definition, as illustrated in FIGS. 2A and 2B. For example, a user can define, within a metadata entity, a system attribute to monitor, raw data to collect, and network nodes to be collected. Furthermore, specific data processing configurations, such as mathematical formulas, can be implemented in the metadata entity to define a new key performance indicator. For example, a metadata entity can direct a network system to initially collect raw data about remaining storage spaces from a network node (e.g., CIS). The metadata entity can define a KPI definition to monitor the network node's free storage space percentage. The KPI definition can comprise a mathematical formula that can instruct the system to divide the collected raw data value by the entire amount of storage space available on the network node, and then multiply that value by one hundred.

In some embodiments, the KPI definition can also comprise additional information, such as a KPI identification (ID) number, indicating the functions the KPI is designed to perform. Furthermore, the metadata entity can be injected into database system 104 during run time and the system can be configured to monitor the KPI definition in a manner defined in the metadata entity. This configuration can advantageously allow a user to dynamically create, access, and modify data on the fly, because a metadata entity can be inserted or injected while a system is running. Conventionally, a database system will need to create one or more database tables in order to monitor a system attribute (e.g., KPI). As an example, in order to monitor power consumption associated with a network node, the database system will need to create a table, as illustrated in Table 1 below, to collect and store power consumption data. The created database table can include a column designated "moname", which can store data utilized to identify a system component from which power consumption data may be collected. The database table of Table 1 can also include a column designated "Consumed Power" for storing the collected power consumption data.

TABLE 1

| moname | host | dbid | ... | Free Memory | Total Memory | Consumed Power |

However, in the event a user wishes to monitor central processor unit (CPU) usage associated with the same network node, one or more columns would have to be added to the database table for storing both the raw data related to CPU usage and a computed CPU usage value. Notably, adding columns to an existing database table can require turning off the services (e.g., turning off services to other applications, such as closing one or more active sessions and connections) of the database system in order to modify one or more parameters (e.g., change parameters values to expand the database table) associated with the database system schema. As used herein, the terms "database system schema" or "schema" refer to a set of definitions and parameters described in a formal language supported by the database management system designed to describe the entire configuration of the database system, including tables, interdependencies, indexes and the like associated with the respective database system. In addition, in the event that a user wishes to collect data associated with a new system attribute from a new network component, an entirely new database table comprising new columns would need to be created for accommodating the collection and storage of the new system attribute data. The creation of a new database table will similarly require turning off the services of the database system to update and/or modify the database system schema.

In some embodiments, one aspect of the subject matter presented herein is configured to allow a database system to collect and store new system attribute data (e.g., KPIs) without turning off the services of the database system. In some embodiments, an attribute monitoring entity (e.g., metadata) comprising one or more KPI definitions can be injected into a repository associated with database system 104. The attribute monitoring entity can be utilized by database system 104 to collect and store the new system attribute data from respective network nodes. For example, exemplary KPI definitions, as illustrated in FIGS. 2A and 2B, can include one or more fields indicating which network node to collect attribute data from (e.g., "componentTagname 209") and/or how to process the collected data (e.g., "formula 208", "measureType 212", "aggregationType 214", and the like). Database system 104 can instruct (e.g., via an API) KPI service modules (e.g. data management module $106_{1-N}$) to collect and process system attribute data as defined in the KPI definition. Furthermore, database system 104 can store new system attribute data as defined in the attribute monitoring entity without modifying existing database tables. In some embodiments, the process data can be designated with a numerical identifier, and a database table comprising at least one generic column and associated with the repository can be utilized to store the processed data according to the numerical identifier. For example, an exemplary KPI definition can include a field designated "kpiid" that is configured to identify the system attribute data being collected. For example, "Consumed Power" can be designated with number "34" and "CPU power consumption" can be designated with number "44". The KPI definition can also include a field designated "value" designed to store system attribute values in a generic fashion (e.g., numerical values). In this scenario, system attribute data can be stored in a database table comprising of generic columns. As such, different types of system attribute data can be saved to the same database table because the table columns can accept any generic data value. Therefore, because the database table does not need to be altered to accommodate new system attribute data, no schema change is required, and as such no system shutdown is required. Thus, a user seeking to monitor new system attribute can instead write code (e.g., new KPI definitions) without a fixed schema for database system 104. Furthermore, this configuration can lower the overall system maintenance cost by auto aging stored data. A metadata entity inserted or injected into the data can comprise a timing parameter configured to expire and phase out data after certain period of time. When the predefined time duration has elapsed, the KPI data can be automatically removed from the database. Furthermore, additional capacity can be conveniently extended with the configuration as illustrated. For example, when demand for system capacity increases, a new hardware based unit 102 including at least one data management module 106 can be readily connected to database system 104. It should be noted that integrating a KPI definition into a metadata entity as disclosed herein is to explain an example and is not intended as limitation, as the general scope of the disclosed subject matter can be conveniently applied to create other software entities for attribute monitoring purposes.

FIG. 2A illustrates an exemplary example of a KPI definition embedded in an application programming interface (API), generally designated 200, as defined by metadata, in accordance with aspects of the subject matter described herein. As illustrated in FIG. 2A, KPI definition 200 can be integrated into a metadata entity and can comprise a KPI ID 202. The KPI ID can indicate to a network system what type of function the KPI is configured to perform. For example, a KPI ID equal to number 2 indicates the KPI is configured to monitor the remaining raw capacity of a network node. In some embodiments, KPI definition 200 can also include a field "name" 203, where name 203 can be used by the network system to collect a specific type of data from a data stream. The source of the collected data can be designated as componentTagName 209. For example, componentTagName 209 "StorageArray" can be used to indicate to the network system that the collected data originates from one or more storage devices. Furthermore, a KPI can include a numericType 211 field and a LONG numericType 211, which can indicate to the network system that the data to be stored will be relatively large in value. In addition, a field "category" 213 can be included in the KPI definition to define what type of data entry the KPI will include. For example, category 213 "ENTRY_PRIMITIVE" means the data stored can be what is collected from the data stream, and the data can be rolled up by performing an AVG roll up operation, as indicated in the field rollupType 215.

In some embodiments, this KPI definition can be further defined by an alias 204 "freeRaw" and a label 206 "Free Raw", and a detailed description of the KPI within a description field 217. Furthermore, a mathematical formula 208 can be incorporated to instruct a network system to process the received raw data. One exemplary mathematical formula 208 may comprise:

$$remainingRawCapacity/1073741824.0 = remainingRawCapacity\ (GB)$$

As illustrated in exemplary mathematical formula 208, "remainingRawCapacity" can represent the collected remaining raw capacity value, and the value can be divided by the number of bytes in a GigaByte (1073741824 bytes) to convert the raw capacity value into a GB format, accompanied by a displaying unit 210 of "GB", as defined in KPI definition 200.

The KPI definition can also indicate to the system that the mathematical operation will require the network system to perform a COUNT type measurement 212, a SUM type aggregation 214, and/or an AVG (average) type rollup.

FIG. 2B illustrates another exemplary example of a KPI definition embedded in an API, generally designated 220, as defined by metadata, in accordance with aspects of the subject matter described herein. As illustrated in FIG. 2B, KPI definition 220 can comprise a KPI ID 222 equal to the number 106 which indicates to the network system that the KPI is configured to perform a free storage space percentage calculation. KPI definition 220 can be described with an alias 224 "freeRawPct", a label 230 "Free Raw (%)", and a description 223. KPI definition can be given a name 225 "remainingRawSpacePct", which can be configured to use data collected from one or more storage devices, as defined in componentTagName 227 "StorageArray". The mathematical calculation to be performed can be defined by an exemplary formula 226:

$$100*freeRaw/totalRaw=remainingRawSpacePct$$

where "remainingRawSpacePct" can represent the percentage of storage space that is available, "free raw" (which is denoted by alias 204) can represent free storage space available, and "totalRaw" (alias not shown in FIGS. 2A and 2B) can represent the total raw storage space available. The network system can be instructed to divide the collected free storage space value "freeRaw" by the total raw storage space value "totalRaw" and then multiply that value by one hundred. In contrast to the KPI definition (e.g., a primitive category) illustrated in FIG. 2A, a percentage calculation (i.e., as a derived category 231) requires the network system to perform a PERCENTAGE type measurement 228, where both the data aggregation 234 and rollup 235 will be an "AVG" type, and the data stored will be a FLOAT numericType 229, represented by unit 233 "%".

FIG. 3 is an exemplary illustration of a plurality of KPI data being stored in a database system in accordance with aspects of the subject matter described herein. In some embodiments, KPI data can be injected and then stored in a repository or database associated with the database system, such as an Apache Cassandra open source database maintained by the Planet Cassandra online community. Within the database system, KPI data can be identified by multiple XML dimension definition labels. For example, multiple KPI data objects can have the same "kpiid" 302 number 2, which indicates to the database system that the KPI data objects are associated with the remaining raw storage capacities of network nodes (e.g., CISs). The dimension labels can also comprise a "host" dimension label 304 configured to display the network address of the KPI data. In addition, specific components where KPI data will be collected can be specified under a "moname" 318 dimension field. For example, moname 318 can list one or more storage arrays where available storage space data will be collected. In some embodiments, multiple CISs can be connected to the database, as indicated in the "cisinfo" dimension label 314, and each CIS can be located at different geographical locations. For example, as indicated in the "geo" dimension label 308, a CIS unit such as unit 200EX is located in Marlborough, Mass., while unit 300EX and unit 300FX are located in San Jose, Calif. Furthermore, key performance indicator values are displayed under the "value" dimension label 306 and stored in different databases, as indicated under a "dbid" dimension label 316. For example, CIS unit 200EX may have 5565 GB of storage space available, as indicated under the dimension label "value" 306, while CIS unit 300EX have 2330.7 GB of storage space left. In addition, storage space information can be deemed critical to database system performance, as indicated under "calstatus" dimension label 310, and CIS entries can be assigned a unique serial number displayed under a "serialnum" dimension label 312.

Figure 4:
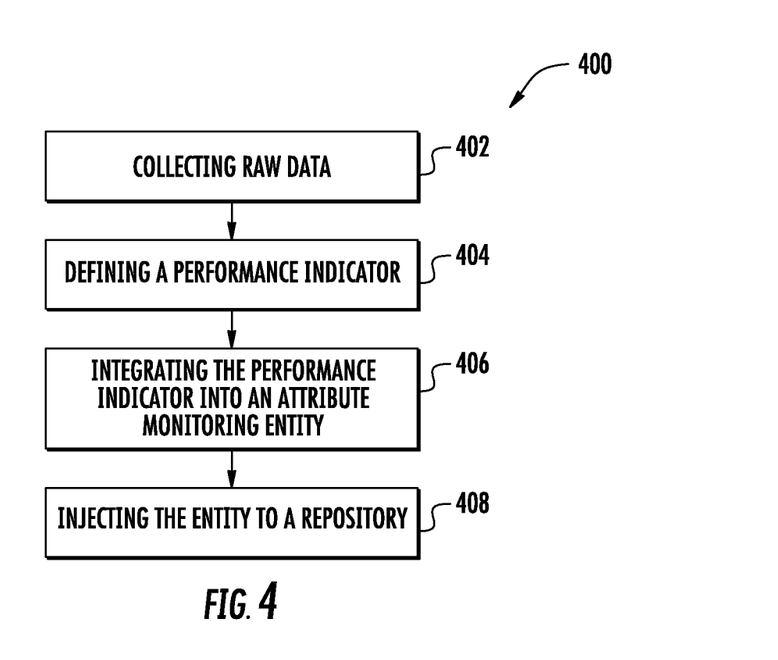
FIG. 4 illustrates a flow chart of an exemplary method for implementing an attribute monitoring entity into the network system in accordance with embodiments of the subject matter disclosed herein.

FIG. 4 is a flow chart illustrating an exemplary method for implementing an attribute monitoring entity into a network system, generally designated 400, in accordance with aspects of the subject matter described herein. As shown in FIG. 4, at step 402, raw data can be collected from at least one network node. For example, a plurality of hardware based units can be configured to collect raw data from network nodes (e.g., CISs). Hardware based units can comprise management modules configured to process the raw data. For example, the data management module can comprise a model collector module configured to receive raw data from a data stream or network node. In some embodiments, a CIS can be associated with a data stream and raw data such as system performance values can be collected from the CIS by the data management module and providing to a data process unit associated with the data management module. Furthermore, the data management module can comprise a KPI collector module configured to process the raw data. The KPI collector can be configured to receive raw data from model collectors and process the received raw data as needed.

At step 404, performance indicators such as KPI definitions can be defined based on the received raw data. In some embodiments, the KPI collector can calculate a key performance indicator by applying a mathematical formula to the received raw data. For example, a KPI related to remaining raw space percentage of the CIS can be defined by dividing the received raw data by the total raw storage space available on the CIS, and then multiply the resulting ratio value by one hundred. In yet another example, KPI collector can be configured to calculate the total bandwidth used over a specified period of time, or the average count of Unavailable nodes.

At step 406, the performance indicator can be integrated into an attribute monitoring entity. For example, an attribute monitoring entity such as a metadata entity can be configured to comprise at least one KPI definition. The metadata entity can also be configured to allow a user to adjust KPI definition parameters and/or insert new KPI definitions.

At step 408, the attribute monitoring entity can be injected into a repository associated with a database system. In some embodiments, an attribute monitoring entity (e.g., metadata) includes one or more KPI definitions. A KPI definition may include parameters identifying the type of raw data that is to be collected, where to collect the raw data, how to process (e.g., what mathematical formula to apply) the collected raw data, and the like. In some embodiments, a new KPI definition can be integrated into metadata to instruct the database system to collect and process new raw data from new data sources in order to generate new KPI information. A user can instruct the database system to collect new KPI information by creating (e.g., write codes for) and inserting metadata with a new KPI definition into the database system (e.g., in some embodiments, injecting metadata into a database schema). As such, the entire network system would not need to be shut down to update the database schema for the database system to collect new raw data. Rather, the user can dynamically insert a new attribute monitoring entity (e.g., metadata) into the database schema, with no system downtime.

Figure 5:
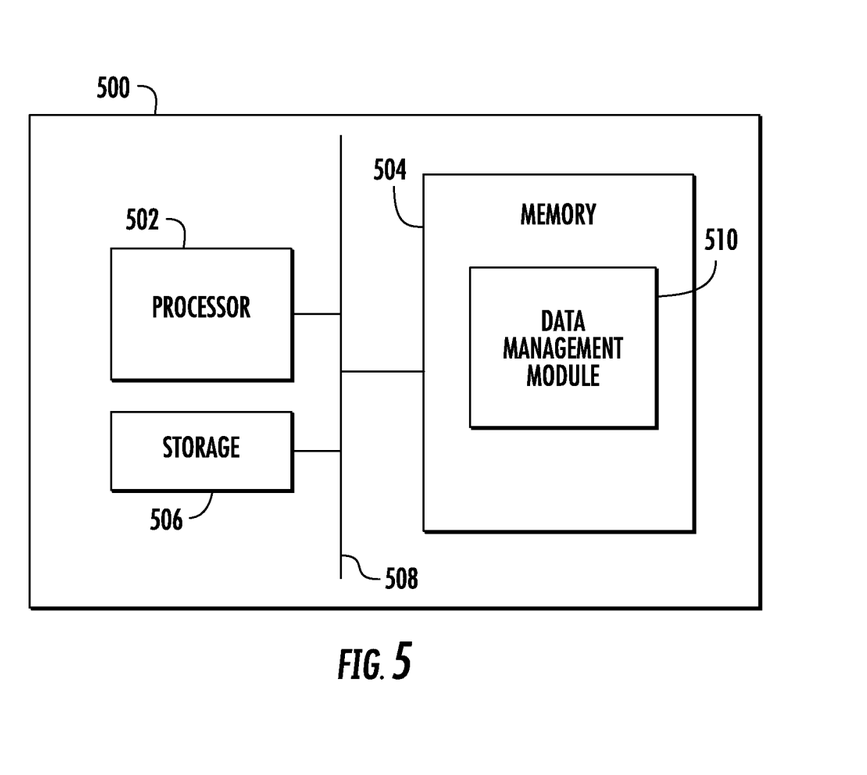
FIG. 5 illustrates a block diagram of a general purpose computer system utilized in accordance with embodiments of the subject matter described herein.

FIG. 5 depicts a high level block diagram of a general purpose computer system suitable for use in performing the functions described herein. As depicted in FIG. 5, system 500 comprises a processor 502, a memory 504, a storage device 506, and communicatively connected via a system bus 508. In some embodiments, processor 502 can comprise can comprise a microprocessor, central processing unit (CPU), or any other like hardware based processing unit. In some embodiments, a data management module 510 can be stored in memory 504, which can comprise random access memory (RAM), read only memory (ROM), optical read/write memory, cache memory, magnetic read/write memory, flash memory, or any other non-transitory computer readable medium. In some embodiments, processor 502 and memory 504 can be used to execute and manage the operation of data management module 510. In some embodiments, storage device 506 can comprise any storage medium or storage unit that is configured to store data accessible by processor 502 via system bus 508. Exemplary storage devices can comprise one or more local databases hosted by system 500.

As indicated above, the subject matter described herein can be implemented in software in combination with hardware and/or firmware. For example, the subject matter described herein can be implemented in software executed by a processor. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. As used in the present disclosure, the term "module" refers to hardware, firmware, or software in combination with hardware and/or firmware for implementing features described herein.

While the systems and methods have been described herein in reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. A method comprising:
   receiving, by one or more computers, a metadata file specifying a performance indicator definition for a network system, wherein the metadata file specifies a type of raw data to collect, one or more network node addresses, and at least one data processing operation to apply to collected raw data, and wherein the performance indicator definition additionally specifies a new performance indicator previously undefined in a database system implementing a database storing performance data for a plurality of different types of performance indicators, and wherein the metadata file comprises multiple markup language dimension definition labels for identifying the type of raw data to collect, the one or more network node addresses, and the at least one data processing operation to apply to collected raw data;
   collecting, by the one or more computers, raw data from a network node in accordance with the type of raw data and the one or more network node addresses specified in the performance indicator definition, wherein the network node comprises a physical computing platform including one or more processors and memory, and wherein the raw data comprises system attribute data for the physical computing platform;
   processing, by the one or more computers, the raw data into processed data in accordance with the at least one data processing operation specified in the performance indicator definition; and
   storing, by the one or more computers and in response to receiving the metadata file, the processed data in the database storing performance data for a plurality of different types of performance indicators without changing a schema of the database for performance indicators, including storing at least a portion of the processed data in a generic portion of the database;
   wherein storing the processed data in the database storing performance data for a plurality of different types of performance indicators comprises storing the processed data while the database system continues storing other performance data and without shutting down the database to accommodate the new performance indicator.

2. The method of claim 1 wherein collecting raw data from a network node comprises collecting the system attribute data from at least one converged infrastructure system via a model collector module.

3. The method of claim 1 wherein collecting raw data further comprises:
   defining a data source based on a user request;
   integrating the data source definition into a key performance indicator (KPI) definition; and
   collecting data from the data source.

4. The method of claim 1 wherein defining a performance indicator definition comprises defining a key performance indicator (KPI) definition associated with the collected raw data.

5. The method of claim 4 wherein defining a key performance indicator (KPI) definition comprises incorporating a mathematical formula into the KPI definition configured to process the collected raw data.

6. The method of claim 1 comprising injecting a metadata entity into the database system, wherein the metadata entity includes at least one key performance indicator (KPI) definition.

7. The method of claim 1 further comprising:
   designating the processed data with a numerical identifier; and
   storing the processed data in the database using at least one generic column.

8. A system for dynamically monitoring a system attribute, the system comprising:
   a processor; and
   a data management module executing on the processor, wherein the data management module is configured to perform operations comprising:
      receiving a metadata file specifying a performance indicator definition for a network system, wherein the metadata file specifies a type of raw data to collect, one or more network node addresses, and at least one data processing operation to apply to collected raw data, and wherein the performance indicator definition additionally specifies a new performance indicator previously undefined in a database system implementing a database storing performance data for a plurality of different types of performance indicators, and wherein the metadata file comprises multiple markup language dimension definition labels for identifying the type of raw data to collect, the one or more network node addresses, and the at least one data processing operation to apply to collected raw data;

collecting raw data from a network node in accordance with the type of raw data and the one or more network node addresses specified in the performance indicator definition, wherein the network node comprises a physical computing platform including one or more processors and memory, and wherein the raw data comprises system attribute data for the physical computing platform;

processing the raw data into processed data in accordance with the at least one data processing operation specified in the performance indicator definition; and storing, in response to receiving the metadata file, the processed data in the database without changing a schema of the database storing performance data for a plurality of different types of performance indicators for performance indicators, including storing at least a portion of the processed data in a generic portion of the database;

wherein storing the processed data in the database storing performance data for a plurality of different types of performance indicators comprises storing the processed data while the database system continues storing other performance data and without shutting down the database to accommodate the new performance indicator.

9. The system of claim 8 wherein the data management module is further configured to define a data source based on a user request, integrate the data source definition into a key performance indicator (KPI) definition, and collect data from the data source.

10. The system of claim 8 wherein the data management module comprises a key performance indicator (KPI) collector module configured to process the received raw data according to the performance indicator definition.

11. The system of claim 10 wherein the performance indicator definition is a key performance indicator (KPI) definition configured to monitor system performance.

12. The system of claim 10 wherein the key performance indicator (KPI) definition comprises a mathematical formula designed to process the received raw data.

13. The system of claim 10 wherein the operations further comprise designating the processed data with a numerical identifier, and storing the processed data in the database using at least one generic column configured to store the numerical identifier.

14. The system of claim 8 wherein the attribute monitoring entity comprises a metadata entity configured to include at least one performance indicator definition.

15. A non-transitory computer readable medium having stored thereon executable instructions that when executed by a processor of a computer control the computer to perform steps comprising:

receiving a metadata file specifying a performance indicator definition for a network system, wherein the metadata file specifies a type of raw data to collect, one or more network node addresses, and at least one data processing operation to apply to collected raw data, and wherein the performance indicator definition additionally specifies a new performance indicator previously undefined in a database system implementing a database storing performance data for a plurality of different types of performance indicators, and wherein the metadata file comprises multiple markup language dimension definition labels for identifying the type of raw data to collect, the one or more network node addresses, and the at least one data processing operation to apply to collected raw data;

collecting raw data from a network node in accordance with the type of raw data and the one or more network node addresses specified in the performance indicator definition, wherein the network node comprises a physical computing platform including one or more processors and memory, and wherein the raw data comprises system attribute data for the physical computing platform;

processing the raw data into processed data in accordance with the at least one data processing operation specified in the performance indicator definition; and storing, in response to receiving the metadata file, the processed data in the database without changing a schema of the database storing performance data for a plurality of different types of performance indicators for performance indicators, including storing at least a portion of the processed data in a generic portion of the database;

wherein storing the processed data in the database storing performance data for a plurality of different types of performance indicators comprises storing the processed data while the database system continues storing other performance data and without shutting down the database to accommodate the new performance indicator.

16. The non-transitory computer readable medium of claim 15 wherein collecting raw data further comprises:
defining a data source based on a user request;
integrating the data source definition into a key performance indicator (KPI) definition; and
collecting data from the data source.

17. The non-transitory computer readable medium of claim 15 wherein defining a performance indicator definition comprises defining a key performance indicator definition associated with the collected raw data.

18. The non-transitory computer readable medium of claim 17 wherein defining a key performance indicator definition comprises incorporating a mathematical formula into the KPI definition configured to process the collected raw data.

19. The non-transitory computer readable medium of claim 15 comprising injecting a metadata entity into the database system, wherein the metadata entity includes at least one key performance indicator (KPI) definition.

20. The non-transitory computer readable medium of claim 15 wherein the steps further comprise:
designating the processed data with a numerical identifier; and
storing the processed data in the database using at least one generic column.

* * * * *